Feb. 28, 1967  K. GUTWIRTH ETAL  3,305,937
METHOD AND APPARATUS FOR DRYING SUSPENSIONS
Filed Nov. 19, 1964  2 Sheets-Sheet 2

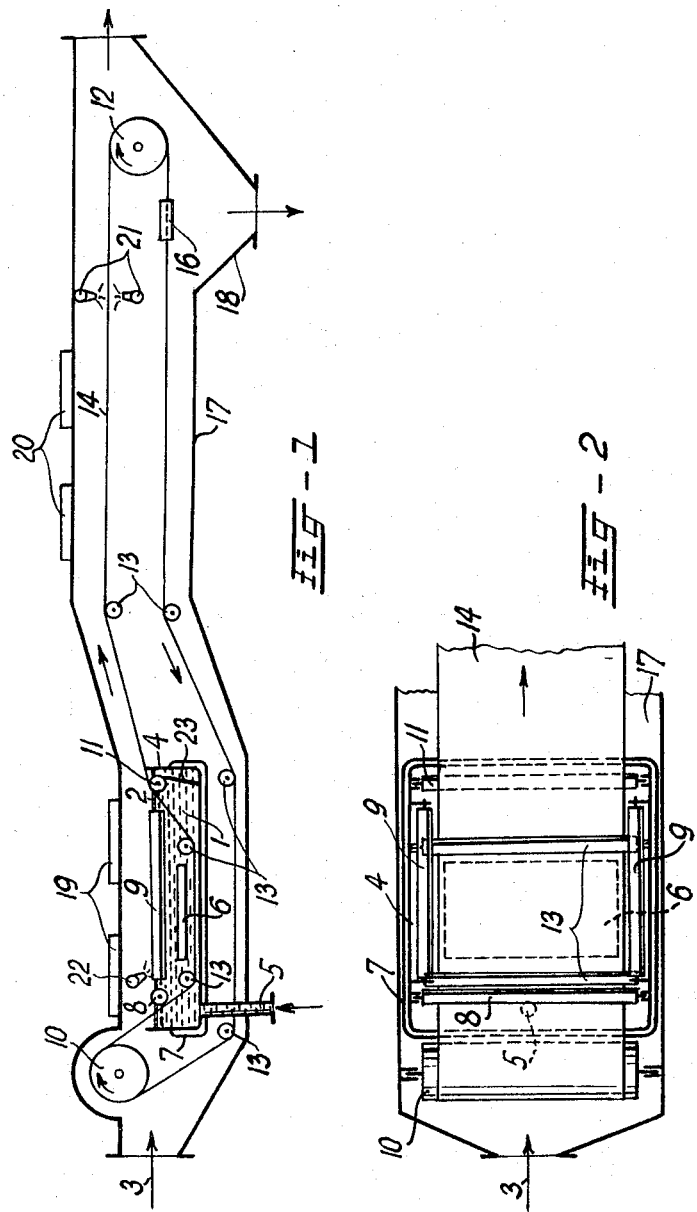

INVENTORS
Karel Gutwirth
Jan Kaspar

BY

Michael S. Striker
ATTY

United States Patent Office 3,305,937
Patented Feb. 28, 1967

3,305,937
METHOD AND APPARATUS FOR DRYING SUSPENSIONS
Karel Gutwirth, 116 Strossova, and Jan Kaspar, 1332 U kostelicka, both of Pardubice, Czechoslovakia
Filed Nov. 19, 1964, Ser. No. 412,564
Claims priority, application Czechoslovakia, Dec. 12, 1963, 6,848/63
20 Claims. (Cl. 34—17)

Drying is an operation applied to a large extent in the chemical industry, especially in the dye manufacture. The existing apparatus for the drying operation of most various types and designs have either a low output (e.g. hot air and vacuum chest driers), or their use is restricted to materials of particular qualities (so that e.g. through-flow and fluidization driers cannot be employed for sticky substances).

Suspensions of finely dispersed dyes, owing to their fine structure and especially to the influence of various dispersing agents, differ substantially from all other materials. In the course of drying a suspension of finely dispersed dyes the viscosity is increasing in a degree resulting in turning the suspension into a greasy condition. On continued drying it is condensed to a pasty consistence, whereof by complete drying hard brittle lumps are formed. Moreover, during all the drying process, the material shows a strong stickiness.

With regard to these specific properties the finely dispersed dye suspensions are dried mostly in atomizers, cylindrical or chest drying ovens. Although atomization is relatively advantageous from the operational and economical viewpoint, its drawback is the inconvenient handling accompanied with sensible dust nuisance, since the product is obtained in the form of a very fine powder. At dissolving the powder has tendency to be agglomerated to clods, the disentegration of which is difficult, thus making dissolving too lengthy. For a contingent agglomerationn of the powder to a suitable form additional apparatus are necessary.

In drying finely dispersed dye suspensions in a cylinder drier the following drawbacks are shown: uneven application, baking on of the dye, difficulties with scraping off, frequent necessity of maintaining the knives and cylinders.

Figure 3:
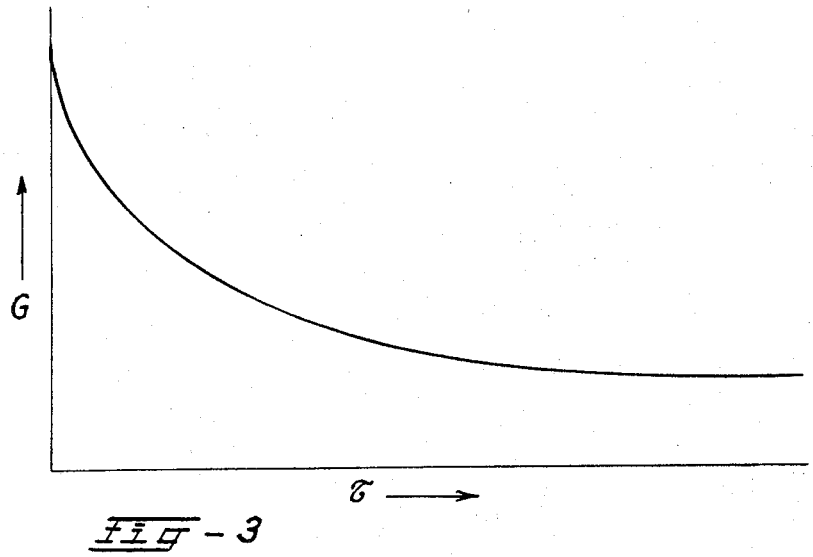

Likewise the drying of finely dispersed dye suspensions in a chest drier brings a series of drawbacks: manual operation, long drying time and the low capacity resulting thereof, and the possible deterioration of the dye, heavy production losses, and higher operational cost. The long time required for drying finely dispersed dye suspensions in the chest drier is due on the one hand to the drying method, and on the other hand to the fact that during drying a layer of partly dried material in the form of a skin or film on the surface is formed, impeding the exchange of the mass between the suspension and the air. This fact is illustrated by the FIG. 3, wherein the course of drying a suspension on a pan blown upon is plotted on the coordinates: weight of the substance on the pan G, and the time τ. The relatively high initial weight loss is rapidly decreasing, in consequence of the formation of a skin. Another drawback of the known methods and apparatus are the different conditions of drying existing in the individual parts of the drying space (different temperatures and rate or the drying medium, etc.), resulting in uneven drying. A part of the material is overdried, while the other part remains dried unsufficiently. Thereby on the other hand, the specific utiliization of the drying space is decreased, and on the other hand the quality of the dried material may be impaired (especially with heat sensbile materials).

There are known also other, less usual drying oven systems that might find use for drying finely dispersed dye suspensions. Such are e.g. the driers according to the U.S. Patent No. 2,705,137 or to the Swiss Patent No. 299,225. Both of these drying ovens consist in the essence of a vacuum chamber, in which a belt conveyer is placed, whereon the material is dried by means of heat radiating bodies. In the former system the material to be dried is applied directly to the belt making the belt wade through the vessel containing the material, whereas in the latter system the material is supplied upon the belt by a spout. Both systems, noted otherwise by considerable drying effect, show the common drawback in the method of applying the material to the belt (similarly as it is the case with cylinder driers), and in the circumstance that moisture can be taken away from one side of the layer only, the other side being under cover of the belt. With the said drawback the relatively low specific capacity of the apparatus is connected.

The method of drying suspensions according to the present invention consists in that a floating skin is formed on the surface of the suspension to be dried by means of an intensive exchange of heat and the mass, the skin at relatively small thickness having sufficient strength to be removed in the form of a film, periodically, or continuously, from the surface, and subjected to final drying outside the space of the vessel containing the suspension. The final drying can be effected by blowing upon a drying medium, by aid of heat radiating bodies, air jets, or by any other means.

The formation of the film-like skin on the surface and the final drying thereof proceeds mostly at atmospheric pressure, in special cases the drying may be effected at subatmospheric pressures of 0.5–0.8 atm.

The output of the apparatus in drying the suspension in the form of a skin is determined by the rate of renewing the skin on the surface and by the thickness thereof. The formation of the skin is influenced by the composition of the suspension, among other by the amount of the dispersing agent used. The temperature and concentration of the suspension are of substantial influence. Besides, the rate of skin formation is considerably influenced by the rate of carrying away the moisture from the surface of the suspension, dependent in the first place on the mode and rate of the drying medium flow along the surface.

Figure 4:

The skin thickness is dependent on the same quantities, however to a far lesser degree. It was found that under constant conditions an equilibrium is established after some definite time interval, whereon the thickness does not sensibly vary. At this condition, according to FIG. 4, the rate of moisture exchange from the skin 2 into the drying medium 3 is constant. Thereby comes to condensation of the suspension, which is of advantage in view of the further development of the skin. In order to render possible pulling off the skin in the form of a film from the suspension surface it is necessary to care about that the film might get stuck by drying to the vertical walls of the vessel containing the suspension. Sticking can be prevented by stirring the suspension by means of stirrers placed along the walls of the vessel.

The strength of the skin film is sufficient, no doubt, to allow for taking it off and forwarding it to the zone of final drying, however in operation, this method is not reliable enough, since, especially at the start of final drying, the film easily may be injured and thus endangered by breakage. Operational reliability can be increased by fastening the film directly on the suspension surface to elements, by which not only its strength is increased, but also the chance is given of fastening the edge of the film accidentally torn. Such elements can be of various kinds, and may differ according to the mode of removing the film from the surface; for a continuous method they are arranged to form an endless belt.

The elements serving for pulling off the film from the suspension surface catch the film by their surface only; during this action the square measures of the film remain unchanged. For reinforcing the film elements with openings, slots, and the like, proved sufficient, allowing the moisture to be drawn off from both sides of the film.

The abovedescribed drying method is carried out in an apparatus illustrated in the FIGS. 1 and 2. The apparatus consists of the vessel 4 containing the suspension 1, the vessel being provided with the supply neck 5, heating wall tubes 6 or a steam jacket 7, and with the stirrers 8 and 9. Further accessories of the apparatus are the pulleys 10, 11, 12 and 13, leading and supporting the belt 14 for pulling off and conveying the film, which after having been finally dried is removed from the belt by the device 16. The vessel 4 and the belt 14 are encompassed in the channel 17 with the discharge chutes 18, passed through by the drying medium 3. In the channel the heat radiating bodies 19 and 20, so as the air jets 21 and 22 can be placed.

The operation of the apparatus is like this: The suspension 1 is continuously dosed by the neck 5 into the vessel 4 as to keep the level constant. The content of the vessel is heated to the corresponding temperature by means of the wall tubes 6 or the jacket 7, or if need be, using the heat radiating bodies 19. The drying medium stream through the channel 17 along the vessel 4, and is supplemented, if need be, by the jet 22. The film 2 formed on the surface of the suspension 1 is caught by the belt 14 passing through the content of the vessel 4, and is pulled off from the surface over the pulley 11 into the further zone of the appaartus, where it is subjected to final drying by means of the drying medium 3, contingently under auxiliary use of the heat radiating bodies 20 and air jets 21. The movement of the belt 14 can be continuous or discontinuous, whereat the time of its rest corresponds to the time necessary for the formation of the film, and the subsequent displacement of the belt is equal to the length of the vessel 4.

The take off of the film from the surface can be carried out also periodically by aid of frames, grates or any other suitable elements. The stirrers 8 and 9 prevent formation of skin at the front and lateral walls (in the direction of the belt movement) of the vessel 4. At the rear side a similar function is provided by the partly submerged pulley 11. The height of the vessel 4 is designed as low as possible, in order to keep the content and thereby the detent of the suspension at a minimum. The rotating stirrers 8 and 9 can have any arbitrary shape, on principle (blades, knurled cylinders, etc.). At a suitable number of revolutions smooth cylinders are sufficient to fulfill the task.

Figure 5:
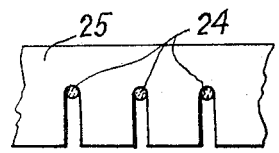
Figure 6:
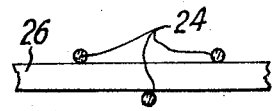

The peripheral velocity of the pulley 11, over which the film 2 is drawn off at the surface has to be corresponding or a little lower than the velocity of the belt 14. The pulley 11 can be cleaned by means of the knife 23. The belt 14 can be made of cloth, wire netting, grate, etc. It can even consist of the film itself when reinforced by a system of parallel ropes with a suitable spacing. The device 16 for removing the dried film from the belt can consist of rotating brushes, beaters, etc. For a belt formed by parallel ropes a device according to FIGS. 5 and 6 is suitable, whereat the ropes 24 by a wiping comb 25 or are drawn alternatively over an edge of the fixed slat 26. If desired, the device 16 can be supplemented by a crusher.

Since after complete drying the film mostly goes to pieces and falls off the belt already before the device 16, the latter has to remove only the remainder of the dried film. For discharging the dry material fallen off from the drying apparatus it is useful to have arranged the bottom of the channel 17 to the shape of a gravity trough, shaking gutter, bulk or belt conveyer, and the like. The drying apparatus can be arranged diversely, according to various requirements and conditions. In the FIG. 1 both strands of the belt pass through a common channel, and the completely dried film is removed from the belt behind the pulley 12. The apparatus can be designed also in the manner that the recurrent strand of the belt 14 passes through an independent channel or outside of the channel. In all events it can be provided for a partial recycling of the drying medium. The device 16 for removing the completely dried film from the belt 14 can be situated nearer to the vessel 4, in order to utilize a part or all of the recurrent strand of the belt 14 for the final drying. The drying apparatus can also be designed in a doubled execution, comprising two pans. In this case the upper and the lower strand of the belt 14 operate as independent driers, placed either in a common or separate channel.

Within a general arrangement the part of the apparatus serving for final drying of the film can be disposed also in an inclined or vertical position.

By the method according to the invention the unfavourable influence of the special properties of finely dispersed dye suspensions upon the course of drying are not only obviated, but even utilized for intensifying the drying operation. The free surface is continuously renewed, the skin formed being removed to the space, where it is additionally and finally dried to the desired humidity degree. The final drying of the film thus formed is very rapid in consequence of its slight thickness, and even under observing considerate conditions it takes but a few minutes. After final drying the material is brittle, so that it can be mechanically easily crushed to pieces of suitable size. In this form the material can be easily handled without dusting. The product thus obtained is noted by ready solubility.

What we claim is:

1. A method of drying finely divided particles of film-forming material suspended in a liquid comprising the steps of maintaining a bath of the liquid in which said particles to be dried are suspended; heating at least the surface of said bath so as to form a film from said particles on said surface; withdrawing the film from the surface of said bath; and heating said film after withdrawal to completely dry the material forming the film.

2. A method as defined in claim 1, and including the step of maintaining the level of said bath at a substantially constant elevation while repeating the aforementioned steps.

3. A method as defined in claim 1, wherein said film is intermittently withdrawn.

4. A method as defined in claim 1, wherein said film is continuously withdrawn.

5. A method as defined in claim 1, wherein said bath is maintained in a vessel open at the top, and including the step of agitating the bath in the region of the upper surface thereof and along the walls of the vessel for preventing said film from sticking to the walls of the vessel.

6. A method as defined in claim 8, wherein said film is withdrawn in a predetermined direction and wherein heating of said surface and heating of said film is at least in part produced by guiding a stream of hot gas over said surface and said film.

7. A method as defined in claim 1, and including the step of supporting said film at least along part of its bottom surface during withdrawal and heating thereof.

8. An apparatus for drying finely divided particles of film-forming material suspended in a liquid comprising, in combination, elongated channel means; a vessel having an open top and being located in said channel means in the region of one end thereof; feeding means for feeding finely divided particles of film-forming material suspended in a liquid into the vessel for maintaining a bath of the suspension therein; means communicating with one end of said channel means for feeding hot gas through said channel means and over the surface of said bath to heat said surface so that a film of said material will form on said surface; and withdrawal means for withdrawing the film in longitudinal direction through said channel means to expose the film to a drying action by the hot gas passing through said channel means.

9. An apparatus as defined in claim 8, wherein said withdrawal means comprise elongated flexible means extending through said bath and longitudinally through said channel means.

10. An apparatus as defined in claim 9, and including a plurality of guide rollers for guiding said elongated flexible means in an endless loop having an upper run passing in the region of one end of the vessel adjacent said one end of said channel means downwardly into said bath and in the region of the opposite end of the vessel upwardly beyond the surface of said bath and in longitudinal direction through said channel means, and a lower run, and drive means connected to at least one of said guide rollers for rotating the same.

11. An apparatus as defined in claim 10, wherein said elongated flexible means comprise a plurality of substantially parallel ropes.

12. An apparatus as defined in claim 11, wherein said guide rollers include one guide roller at said opposite end of said vessel partly submerged in said bath and extending with its peripheral surface upwardly beyond the bath surface.

13. An apparatus as defined in claim 12, and including additional drive means connected to said one guide roller for driving the same with a peripheral speed not exceeding the linear speed of said ropes.

14. An apparatus as defined in claim 8, and including agitating means along at least some of the walls of the vessel in the region of the surface of said bath for preventing said film from sticking to the walls of the vessel.

15. An apparatus as defined in claim 8, and including additional heating means arranged above the surface of said bath and along said channel means downstream of said bath.

16. An apparatus as defined in claim 15, wherein said additional heating means include heat radiating bodies arranged spaced from each other along said channel means.

17. An apparatus as defined in claim 8, and including further heating means for heating the liquid in the vessel.

18. An apparatus as defined in claim 8, wherein said feeding means communicate with the interior of said vessel through a bottom wall of the latter.

19. An apparatus as defined in claim 8, wherein said channel means has a bottom wall and is provided in a region of its other end with a discharge opening in said bottom wall for discharging the dried material therefrom.

20. An apparatus as defined in claim 19, and including scraper means arranged in the region of said discharge opening and cooperating with said withdrawal means for scraping dried material therefrom.

References Cited by the Examiner

UNITED STATES PATENTS

| | | |
|---|---|---|
| 1,250,427 | 12/1917 | Campbell. |
| 1,848,877 | 3/1932 | Gay _____ 34—60 X |
| 2,705,137 | 3/1955 | Haltmeier _____ 263—28 |
| 3,068,585 | 12/1962 | Overton _____ 34—17 |

FREDERICK L. MATTESON, JR., Primary Examiner.

D. A. TAMBURRO, Assistant Examiner.